(12) United States Patent
Millar

(10) Patent No.: US 10,631,387 B2
(45) Date of Patent: *Apr. 21, 2020

(54) SYSTEMS AND METHODS FOR PROVIDING WAVE-BASED LIGHTING EFFICIENCIES

(71) Applicant: Earth Star Solutions, LLC, Eagle Mountain, UT (US)

(72) Inventor: Gary Bret Millar, Highland, UT (US)

(73) Assignee: Earth Star Solutions, LLC, Eagle Mountain, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,042

(22) Filed: Sep. 5, 2019

(65) Prior Publication Data

US 2019/0394846 A1    Dec. 26, 2019

Related U.S. Application Data

(63) Continuation of application No. 16/131,163, filed on Sep. 14, 2018, now Pat. No. 10,448,467, which is a
(Continued)

(51) Int. Cl.
*H05B 33/08* (2020.01)
*H05B 45/46* (2020.01)
*H05B 45/48* (2020.01)

(52) U.S. Cl.
CPC ............. *H05B 45/46* (2020.01); *H05B 45/48* (2020.01); *Y02B 20/341* (2013.01)

(58) Field of Classification Search
CPC ............. H05B 33/0827; H05B 33/083; H05B 33/0845
(Continued)

(56) References Cited

U.S. PATENT DOCUMENTS

2010/0308738 A1  12/2010  Shteynberg et al.
2011/0227489 A1*  9/2011  Huynh ................ H05B 33/083
                                                            315/185 R
(Continued)

FOREIGN PATENT DOCUMENTS

EP          2658348 A2    10/2013
KR       1020090035703     4/2009
WO        2010141684 A1   12/2010

OTHER PUBLICATIONS

International Search Report & Written Opinion pertaining to International Application No. PCT/US2016/062514 dated Jan. 27, 2017.
(Continued)

*Primary Examiner* — Tung X Le
(74) *Attorney, Agent, or Firm* — Dinsmore & Shohl LLP

(57) ABSTRACT

Embodiments of wave-based lighting efficiencies are provided. As an example, a method includes determining a characteristic of a voltage from an alternating current (AC) waveform, where the AC waveform is configured to power a load, and wherein the AC waveform includes positive voltage portions, negative voltage portions, and zero axis points. Some embodiments include determining a first position in the AC waveform to create a first step with a first step voltage and applying the AC waveform at the first step to a first predetermined portion of the load, where the first predetermined portion of the load has a first voltage rating that corresponds to the first step voltage.

20 Claims, 10 Drawing Sheets

Related U.S. Application Data continuation of application No. 15/354,636, filed on Nov. 17, 2016, now Pat. No. 10,111,288.

(60) Provisional application No. 62/256,289, filed on Nov. 17, 2015.

(58) Field of Classification Search
USPC .................................................. 315/152, 312
See application file for complete search history.

(56) References Cited

U.S. PATENT DOCUMENTS

| | | | |
|---|---|---|---|
| 2011/0267375 A1* | 11/2011 | Yang | G09G 3/3406 345/690 |
| 2013/0278163 A1 | 10/2013 | Rodriguez et al. | |
| 2014/0152181 A1 | 6/2014 | Burkhart | |
| 2015/0282260 A1 | 10/2015 | Hussell et al. | |
| 2015/0312983 A1* | 10/2015 | Hu | F21K 9/64 315/186 |
| 2016/0181911 A1 | 6/2016 | Knauss et al. | |
| 2016/0270174 A1* | 9/2016 | Rimmer | H05B 33/0803 |
| 2016/0302270 A1 | 10/2016 | Wang | |
| 2017/0257920 A1 | 9/2017 | Liu | |

OTHER PUBLICATIONS

Non-Final Office Action pertaining to U.S. Appl. No. 15/354,636 dated Sep. 20, 2017. Can be found in the USPTO record for U.S. Appl. No. 15/354,636.

Final Office Action pertaining to U.S. Appl. No. 15/354,636 dated Apr. 19, 2018. Can be found in the USPTO record for U.S. Appl. No. 15/354,636.

Notice of Allowance pertaining to U.S. Appl. No. 15/354,636 dated Jun. 21, 2018. Can be found in the USPTO record for U.S. Appl. No. 15/354,636.

Non-Final Office Action pertaining to U.S. Appl. No. 16/131,163 dated Oct. 17, 2018. Can be found in the USPTO record for U.S. Appl. No. 16/131,163.

Notice of Allowance pertaining to U.S. Appl. No. 16/131,163 dated Jun. 6, 2019. Can be found in the USPTO record for U.S. Appl. No. 16/131,163.

First Examination Report dated Nov. 9, 2018 for New Zealand Patent Application No. 743365 filed Jun. 12, 2018.

* cited by examiner

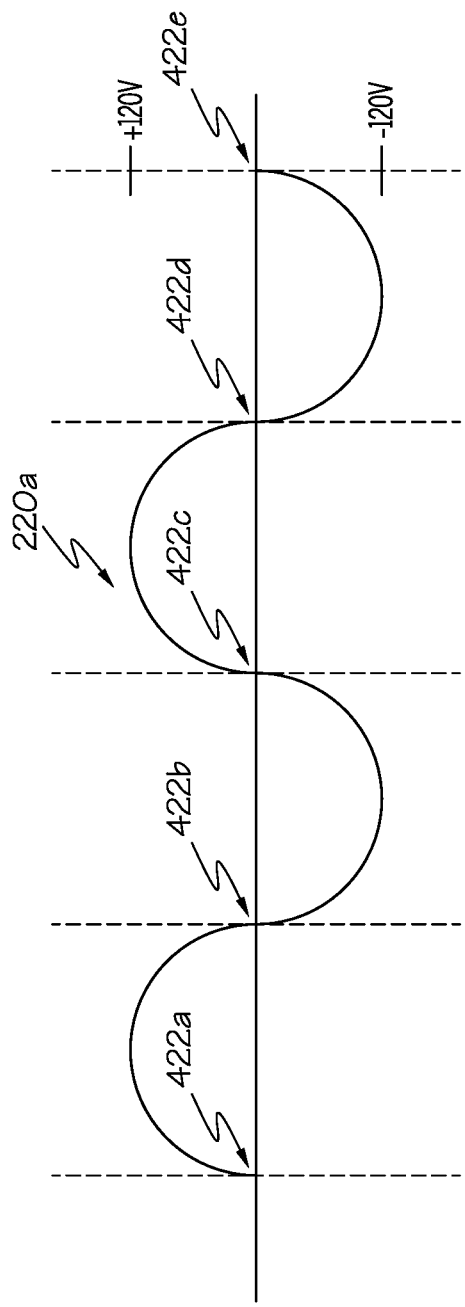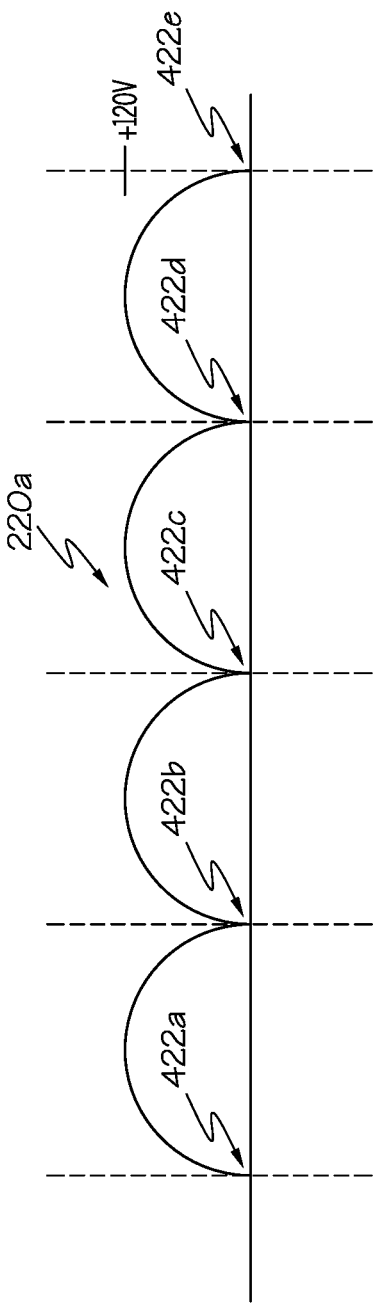
FIG. 4A
FIG. 4B

US 10,631,387 B2

SYSTEMS AND METHODS FOR PROVIDING WAVE-BASED LIGHTING EFFICIENCIES

CROSS REFERENCE

This application is a continuation of U.S. application Ser. No. 16/131,163 filed Sep. 14, 2018, which is a continuation of U.S. application Ser. No. 15/354,636, filed Nov. 17, 2016, which claims the benefit of U.S. Provisional Application No. 62/256,289, filed Nov. 17, 2015, all of which are hereby incorporated by reference in their entireties.

TECHNICAL FIELD

Embodiments described herein generally relate to systems and methods for providing wave-based lighting efficiencies and, more specifically, to utilizing characteristics of an alternating current to increase load efficiency.

BACKGROUND

Lighting and other electrical loads receive the same voltage and current as any other electrical component connected to the grid. While there are a few different voltages that may be utilized, generally speaking, there is little control regarding the power received from an outlet that will be utilized for the load. Accordingly, many current electrical appliances regulate the received current and/or voltage that are to be used to power the electrical appliance to provide the components of the electrical appliance proper power. While these current solutions provide the desired power to the electrical components, the undesirable byproduct is often heat. As a consequence, fans and other cooling mechanisms may be required to prevent damage to the electrical appliance.

SUMMARY

Embodiments of wave-based lighting efficiencies are provided. As an example, a method includes determining a characteristic of a voltage from an alternating current (AC) waveform, where the AC waveform is configured to power a load, and wherein the AC waveform includes positive voltage portions, negative voltage portions, and zero axis points. Some embodiments include determining a first position in the AC waveform to create a first step with a first step voltage and applying the AC waveform at the first step to a first predetermined portion of the load, where the first predetermined portion of the load has a first voltage rating that corresponds to the first step voltage.

Also included are embodiments of a system that include a load that includes a plurality of individual devices and a computing component that is coupled to the load. The computing component may include a processor and a memory component that stores logic that, when executed by the processor, causes the system to determine an alternating current (AC) voltage at a plurality of times, where the voltage is configured to power the load and determine a first predetermined portion of the load that includes at least one of the plurality of individual devices. In some embodiments, the logic causes the system to determine a first voltage rating for the first predetermined portion of the load, determine a first position in the AC voltage to create a first step with a first step voltage that corresponds with the first voltage rating, and apply the AC voltage at the first step to the first predetermined portion of the load.

Also included are embodiments of a device. At least one embodiment includes a computing device that includes logic that, when executed by processor, causes the device to determine a characteristic of a voltage received for powering a load, where the voltage includes positive voltage portions, negative voltage portions, and zero axis points and where the load includes a plurality of individual devices. In some embodiments, the logic further causes the device to allocate a first predetermined portion of the load based on at least one of the plurality of individual devices, determine a voltage rating of the first predetermined portion of the load, and determine a first position of the voltage to create a first step with a first step voltage, where the first step voltage corresponds with a first voltage rating of the first predetermined portion of the load. In some embodiments, the logic causes the device to apply the voltage at the first step to the first predetermined portion of the load.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 4A and 4B depict alternating current waveforms that may be utilized for providing wave-based lighting efficiencies, according to embodiments described herein;

DETAILED DESCRIPTION

Embodiments disclosed herein include systems and methods for providing wave-based lighting efficiencies. Some embodiments may be configured to create at least one voltage step in alternating current input power and activating a first set of loads at a first voltage step (at a first position in the voltage) and a second set of loads at a second voltage step (at a second position in the voltage). The voltage steps may be determined, based on a calculated or predicted voltage level of alternating current power at a first time, a second time, etc. Based on the calculated voltage level and the first time, second, time, etc. the embodiments described herein may activate portions of a load that have voltage requirements that correspond the voltage level of the power at that time. The systems and methods for providing wave-based lighting efficiencies incorporating the same will be described in more detail, below.

Figure 1:
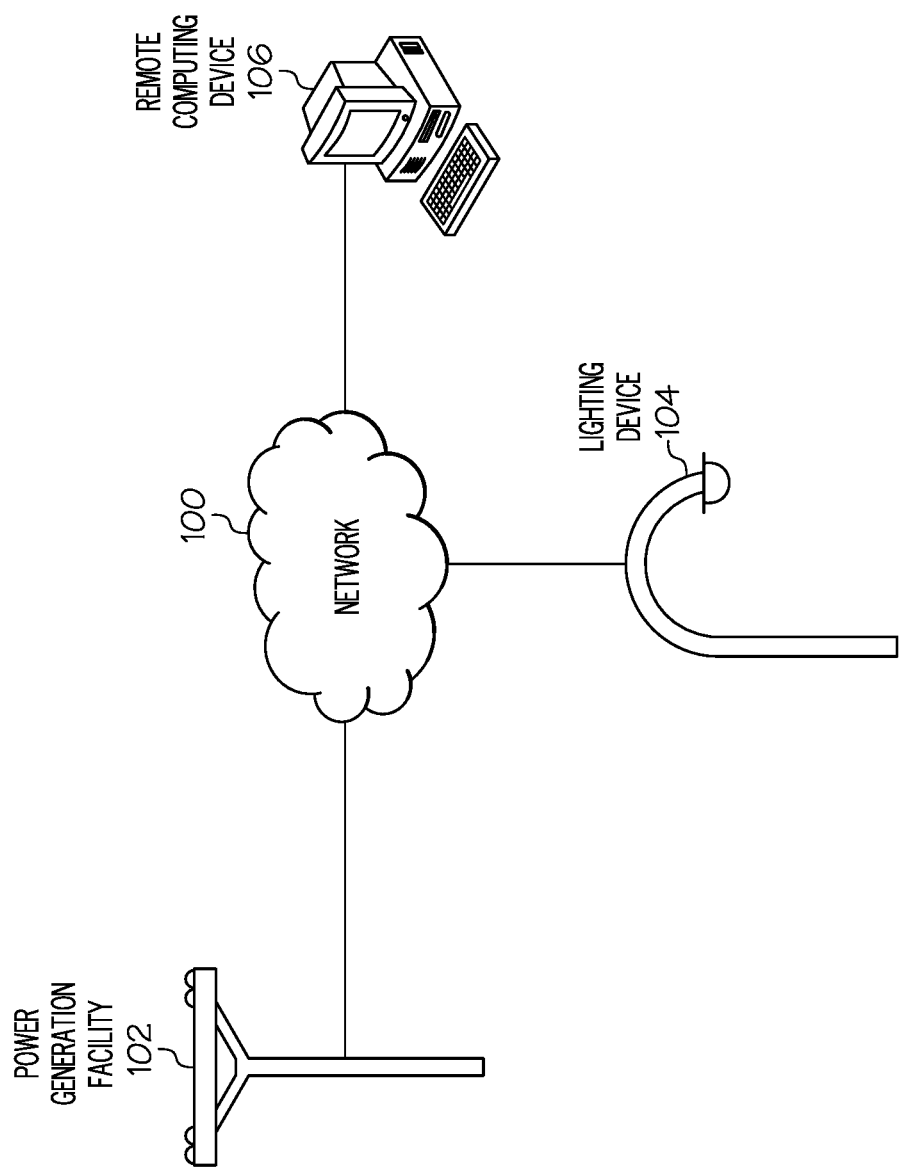
FIG. 1 depicts an electrical environment for providing wave-based lighting efficiencies, according to embodiments described herein.

Referring now to the drawings, FIG. 1 depicts an electrical environment for providing wave-based lighting efficiencies, according to embodiments described herein. As illustrated, the environment may include a network 100, a power generation facility 102, a lighting device 104 (or other load), and a remote computing device 106. The network 100 may include a power network for communicating power and/or a data network for communicating data (such as public switch telephone network, internet, cellular, etc.). The power generation facility 102 may include any power source, such as a power generator, such as a coal plant, a solar plant, hydro-electric plant, a wind energy collection system, geothermal system, a generator, or any other device, system, or facility for generating electricity. Additionally, the power generation facility 102 may output the power at a predetermined amperage and/or voltage and may output the power as alternating current (AC) power. The power generation facility 102 may communicate power to the lighting device 104 and/or other load, which may utilize the power accordingly. The remote computing device 106 may be configured for communicating data, settings, etc. with the lighting device 104, the power generation facility 102, and/or other devices on the network 100.

Figure 2:
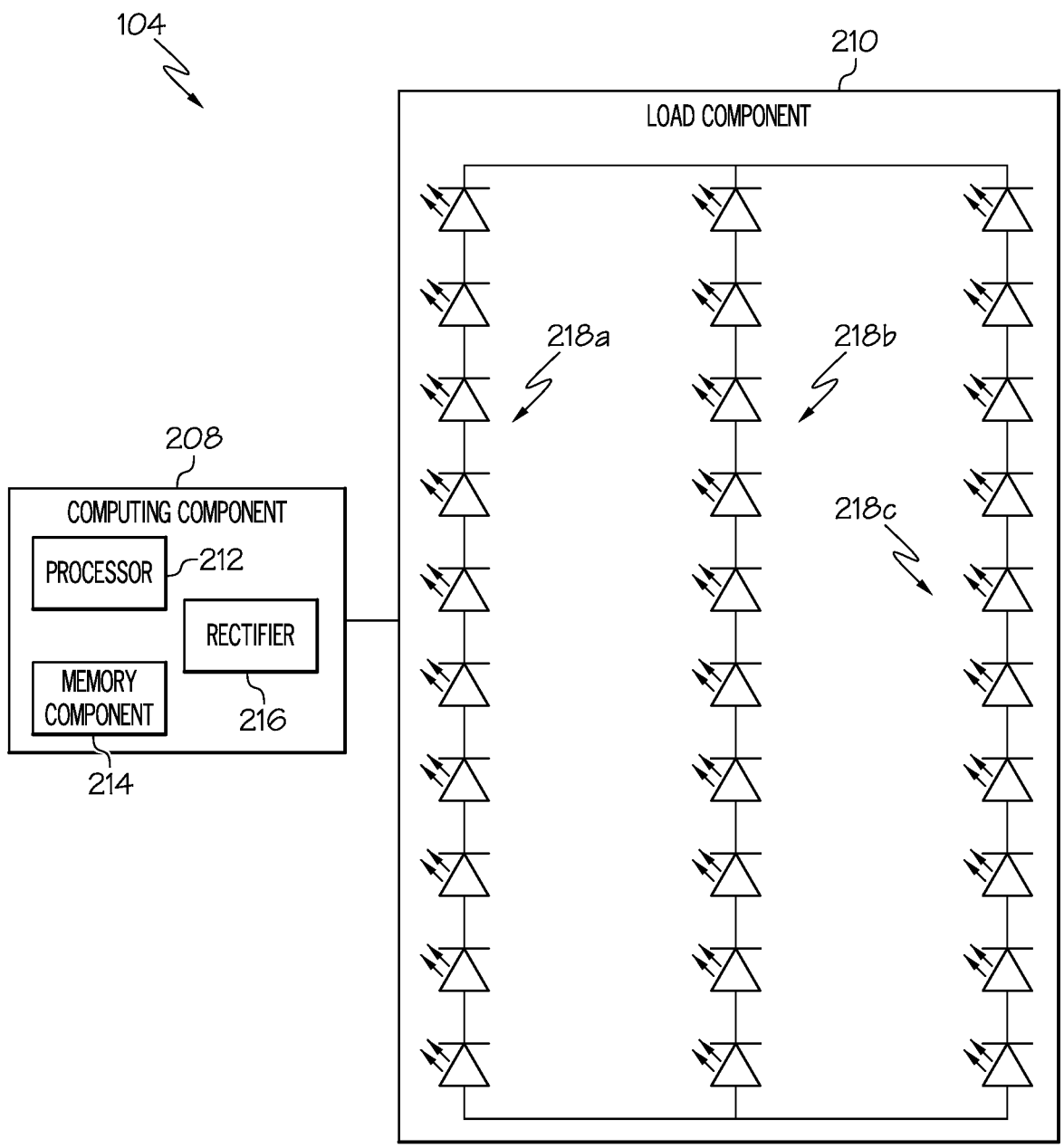
FIG. 2 depicts a lighting device for providing wave-based lighting efficiencies, according to embodiments described herein.

FIG. 2 depicts a lighting device 104 for providing wave-based lighting efficiencies, according to embodiments described herein. As illustrated, the lighting device 104 includes a computing component 208 and a load component 210. The computing component 208 may include a processor 212, a memory component 214 (and/or other non-transitory computer readable medium), a rectifier 216, and/or other components for performing the functionality described herein. The memory component 214 may include program code, logic, circuitry, and/or other hardware, software and/or firmware for implementing one or more lighting configurations, based on received power as well as program code for selecting a desired lighting configuration. The processor 212 may receive and execute the code. The rectifier 216 may receive power from the power generation facility 102 (FIG. 1), as well as instructions on rectifying the received power.

As an example, the computing component 208 may determine that the power being received is 120 volt AC and may rectify the received voltage by switching at least one negative voltage portion (or negative voltage portions) into a positive voltage portion. Specifically, a characteristic of the received power may be determined. The characteristic may include a maximum predicted voltage, a period, a predicted voltage at a predetermined time, a minimum predicted voltage, a zero cross point, etc. As an example, the computing component 208 of the lighting device 104 may predict a time that the received and rectified AC power will reach predetermined voltage levels. With this information, the computing component 208 may determine the number of steps to implement such that the voltage that is actually received is more fully utilized by the load segment (e.g., first predetermined portion of the load, second predetermined portion of the load, etc.), such that all or substantially all of the power is actively utilized, thus reducing the production of heat.

The load component 210 may include a plurality of individual devices, such as one or more lighting elements 218a, 218b, and 218c, which may take the form of light emitting diodes (LEDs). The lighting elements 218 may be configured to operate as different sets or segments of loads and may be configurable based on the particular embodiment. Specifically, an analysis may be performed by the computing component 208 to determine a characteristic of the load and/or one or more of the individual devices, such as a voltage rating of at least one of the plurality of individual devices. As another example, a first predetermined portion of the load may be determined based on an analysis of the voltage rating and a determination of individual devices in the load. Based on this analysis, the computing component 208 may allocate a predetermined portion of the load to a particular step in the voltage. The predetermined portion of the load may have a load rating that corresponds with the voltage level of the voltage step.

It should be understood that while the lighting elements 218 depicted in FIG. 2 are illustrated as being wired in parallel, this is merely an example. In some embodiments, the lighting elements 218 may be hard wired in series, with one or more connections being placed between at least a portion of the lighting elements 218 such that the segments are hardwired. Similarly, some embodiments may be configured with a dynamic and/or programmable configuration of the lighting elements 218, such that the segments may change, based on the power being received.

Figure 3:
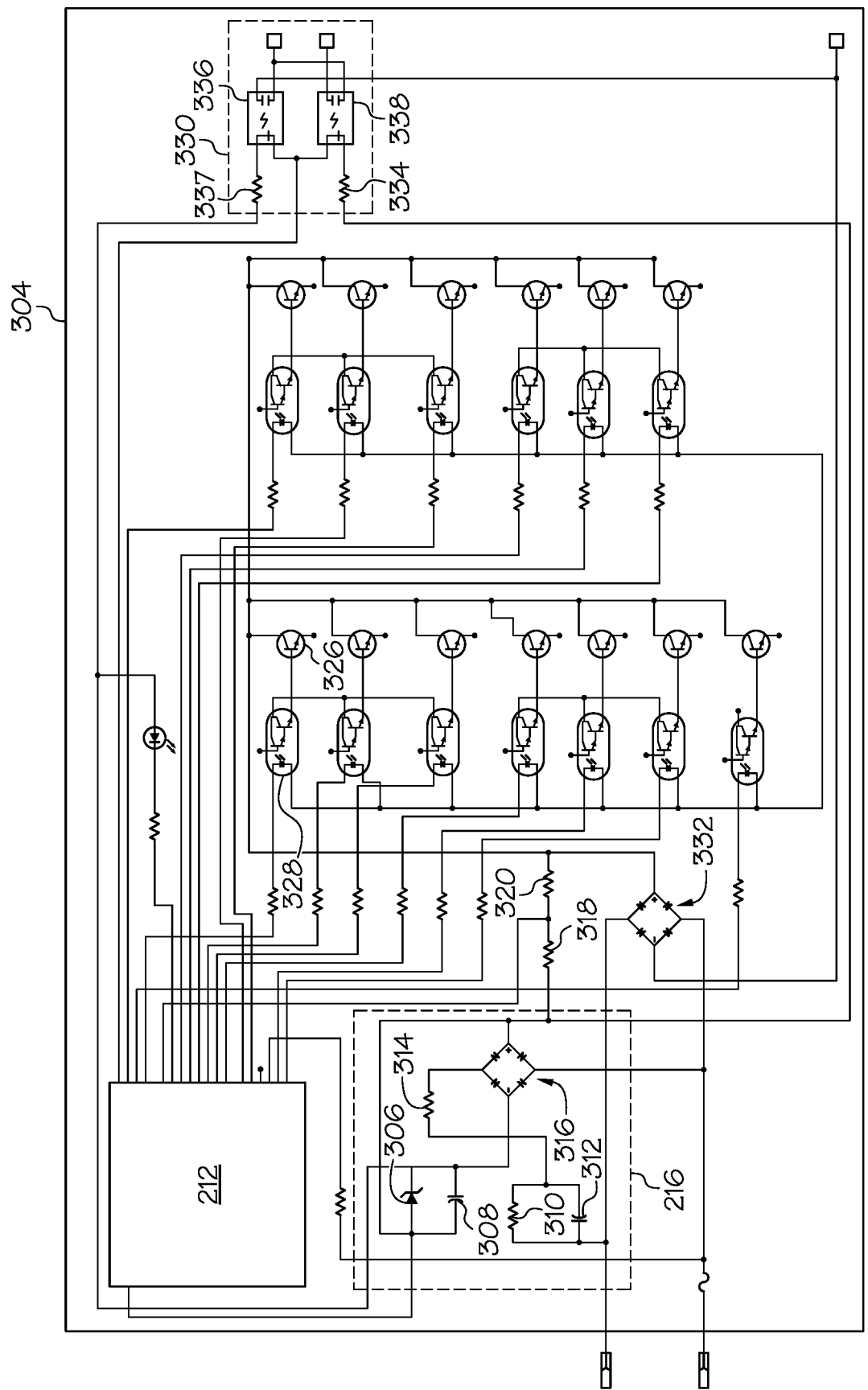
FIG. 3 depicts another embodiment of a computing component, according to embodiments described herein.

FIG. 3 depicts another embodiment of a computing component 208, according to embodiments described herein. While FIG. 2 was a generalized diagram showing various components of the lighting device 104, FIG. 3 depicts a more specific embodiment of a lighting device 104. As illustrated, the computing component 208 includes the processor 212, which is connected to the rectifier 216, as well as a resistor 304. The resistor 304 may be configured to receive power from the power source and sample the AC current to determine the characteristic of the waveform. The resistor 304 may be configured reduce voltage to the processor 212 to determine the zero cross point, as described in more detail below. Also included is the rectifier 216, which may include a diode 306, a capacitor 308, a resistor 310, a capacitor 312, and a resistor 314. Also included is a rectifier bridge 316, which together with the other circuit elements rectifies the input voltage as described herein. As an example, the rectifier 216 may be configured to rectify the voltage from 12 volt AC to 5 volt DC such that the processor 212 may be properly powered.

Also included are resistors 318 and 320, which act as a voltage divider for reducing the voltage into the processor 212. A plurality of transistors 326 and a plurality of optical encoders 328, which each may be coupled to the segments of lighting elements 218 are also provided. The plurality of transistors 326 and the plurality of optical encoders 328 may be configured to control the operation of the lighting elements 218 as described herein. Specifically, after a step is determined, the processor 212 may determine that a predetermined segment of the load is to be activated. If a first segment is to be activated, the processor sends a signal (e.g., 5 volts) to the optical encoder 328, which then opens the transistor 326, which sends power to the segment of load, which may be connected in series to ground. The ground node of the transistor 326 may be connected that segment of the load. If a second step is reached for utilizing a second segment of the load, a second optical encoder 328 may receive the signal from the processor 212. The second optical encoder 328 may send a signal to the second transistor 326, thereby opening a second segment of the load. The remaining segments may be activated utilizing the remaining optical encodes and transistors depicted in FIG. 3.

Additionally included is a transition component 330, which includes resistors 337 and 334, as well as solid state relays 336, 338. The transition component 330 may be configured to allow the system to operate on a variety of voltages, segments as from 80 volts to about 305 volts. As an example, the transition component 330 may be configured to alter a ground voltage so that if a larger amount of power is received, the solid state relay 336 may be implemented, while if a lower amount of voltage is received both the solid state relay 336 and the solid state relay 338 may be utilized.

As illustrated, if the processor 212 determines that a higher voltage is received, the processor 212 may send a signal to the solid state relay 336 and the node between the solid state relays 336, 338, thereby switching the solid state relay 336 off and the solid state relay 338 on. Because the solid state relay 338 is tied to ground, the solid state relay 338 patches segments of the load together to operate at the higher voltage. If a lower voltage is received, the solid state relay 336 may be turned on and the solid state relay 338 may be turned off to disconnect segments of the load, thereby allowing operation at the lower voltage.

FIGS. 4A and 4B depict alternating current waveforms 220a, 220b that may be utilized for providing wave-based lighting efficiencies, according to embodiments described herein. As illustrated in FIG. 4A, the power may be received from the power generation facility 102 (FIG. 1) as an AC waveform 220a, which may be represented as a sinusoidal waveform 220. The sinusoidal waveform 220 may cross the zero axis point (e.g., the point where the power switches from positive to negative polarity or vice versa) at zero axis points 422a-422e. Between the zero axis points 422a-422e, the voltage may increase toward the peak voltage, decrease to zero, increase to zero, or decrease to the minimum voltage.

As discussed above, the sinusoidal AC power or AC voltage may be received by the rectifier 216, which may convert the negative portions of the sinusoidal wave into positive, thus providing the waveform of FIG. 4B. A waveform similar to FIG. 4B may then be utilized for the lighting device 104 and/or other load.

Accordingly, embodiments described herein may be configured to determine a zero axis point 422. From the zero axis point, a sample may be taken at a predetermined time after the determined zero axis point 422. With this information, embodiments may calculate a period, a maximum voltage, and/or other characteristic of the waveform. In some embodiments, a lookup table may be accessed. With this knowledge, voltage steps may be created at points of predicted voltage. Additionally, because the voltage that is received may not behave as a pure sinusoidal wave (e.g., because of dirty voltage), the zero axis point 422 as well as the sample may be determined at a plurality of points. If the waveform is not consistent across periods, alterations to the predicted behavior of the waveform and thus the steps may be made.

Figure 5A:
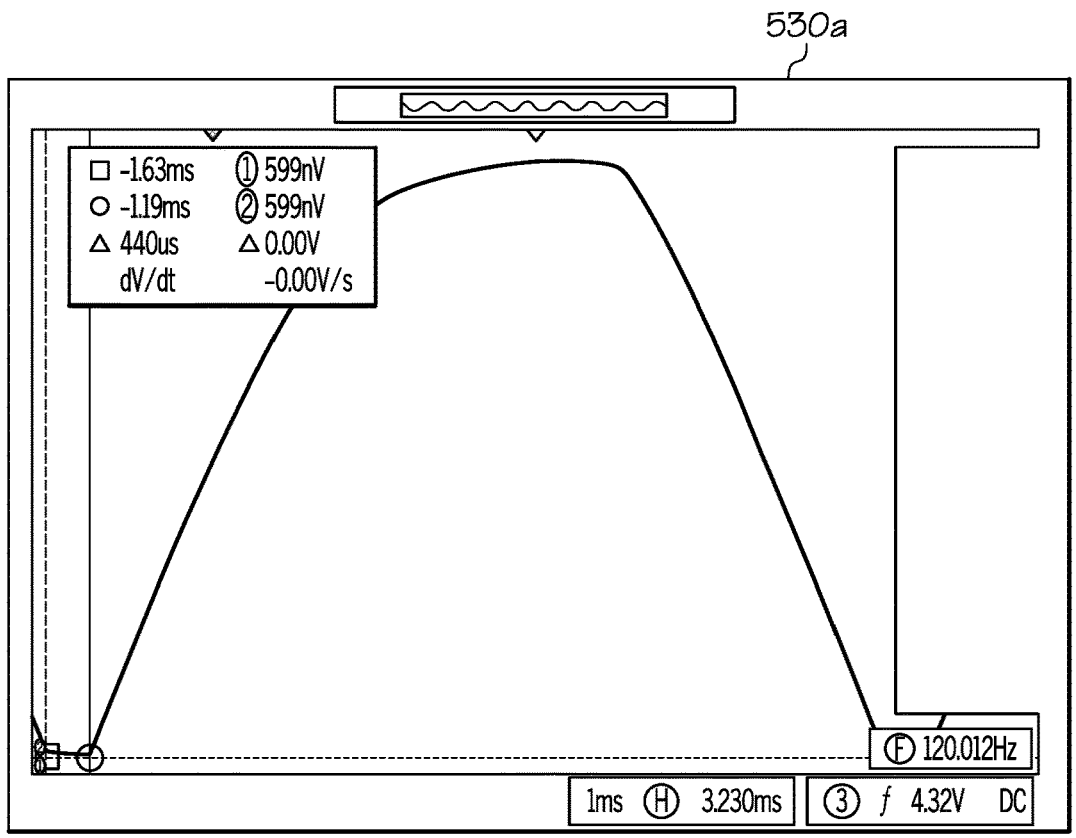
FIGS. 5A and 5B depict user interfaces that provide a platform for determining a first voltage step, according to embodiments described herein.
Figure 5B:
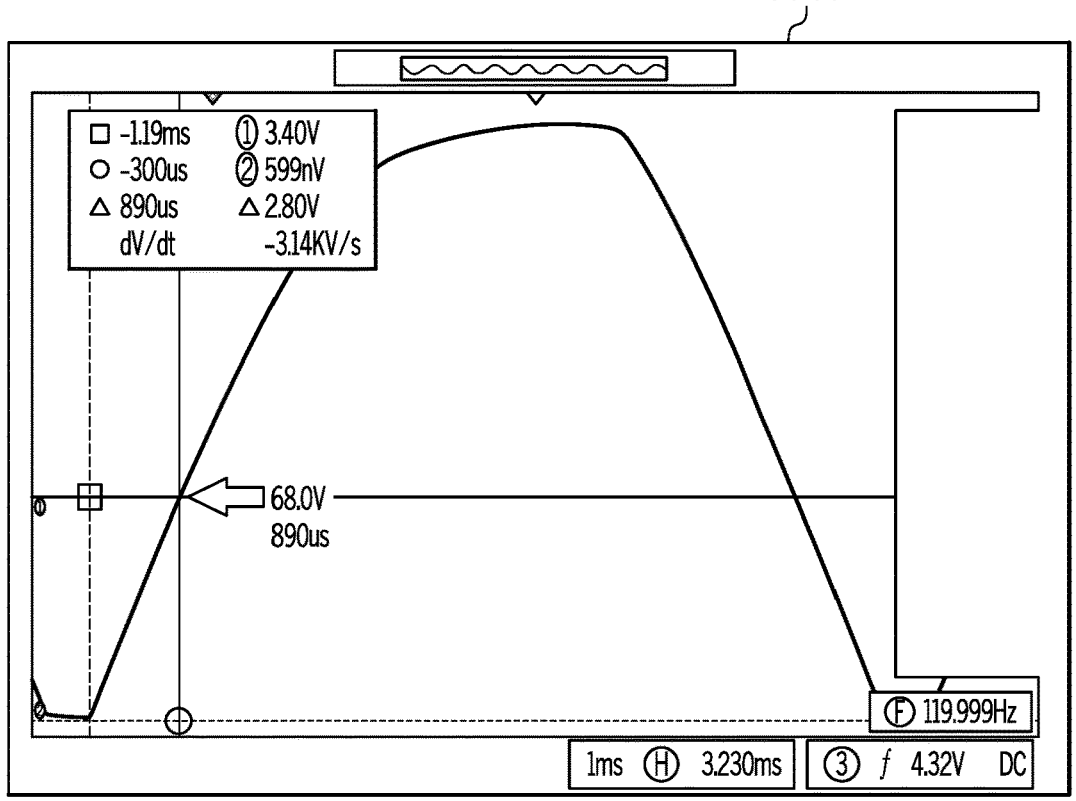

FIGS. 5A and 5B depict user interfaces 530a, 530b that provide a platform for determining a first voltage step, according to embodiments described herein. As illustrated in FIG. 5A, the waveform may have a frequency of about 120 Hertz and a period of about 1 millisecond. The peak voltage may be about 160 volts. Additionally, FIG. 5B depicts the voltage at a predetermined time. Specifically, embodiments described herein may determine a voltage required to power a set of loads in the lighting device 104. As an example, if an LED pulls 2 volts, 34 LEDs pull 68 volts. As such, the embodiments described herein may create a load segment with 34 LEDs. Additionally, embodiments may determine at what time the received voltage will provide about 68 volts and will create a first step at that time.

Additionally, the embodiments may determine at what time the power will reach 136 volts and create a second step at that time (a second portion of the AC waveform). As described herein, the voltage step may be configured as a trigger to activate and/or deactivate segments of a load at a selected time, based on a prediction of the behavior of the received voltage waveform. With this knowledge, the embodiments may configure the lighting device 204 to switch the power to a subset of all of the LEDs at different voltage steps to correspond to the predicted voltage.

As an example, if the LEDs consume 2 volts each, the lighting device 204 may direct the waveform to 34 LEDs at the first step, such that all of the voltage is consumed. This may change at subsequent steps, based on the predicted voltage level at those steps. Accordingly, the power is not wasted as heat, but is instead used in accordance with the sets of LEDs.

It should be understood that while the example above utilizes 68 volts as the first step and 136 volts as the second step, this is just an example. These and/or other steps may be created depending on the particular implementation. Similarly, depending on the actual power consumption of the LEDs (or other load components), a different lighting or utilization schemes may be created.

Figure 6A:
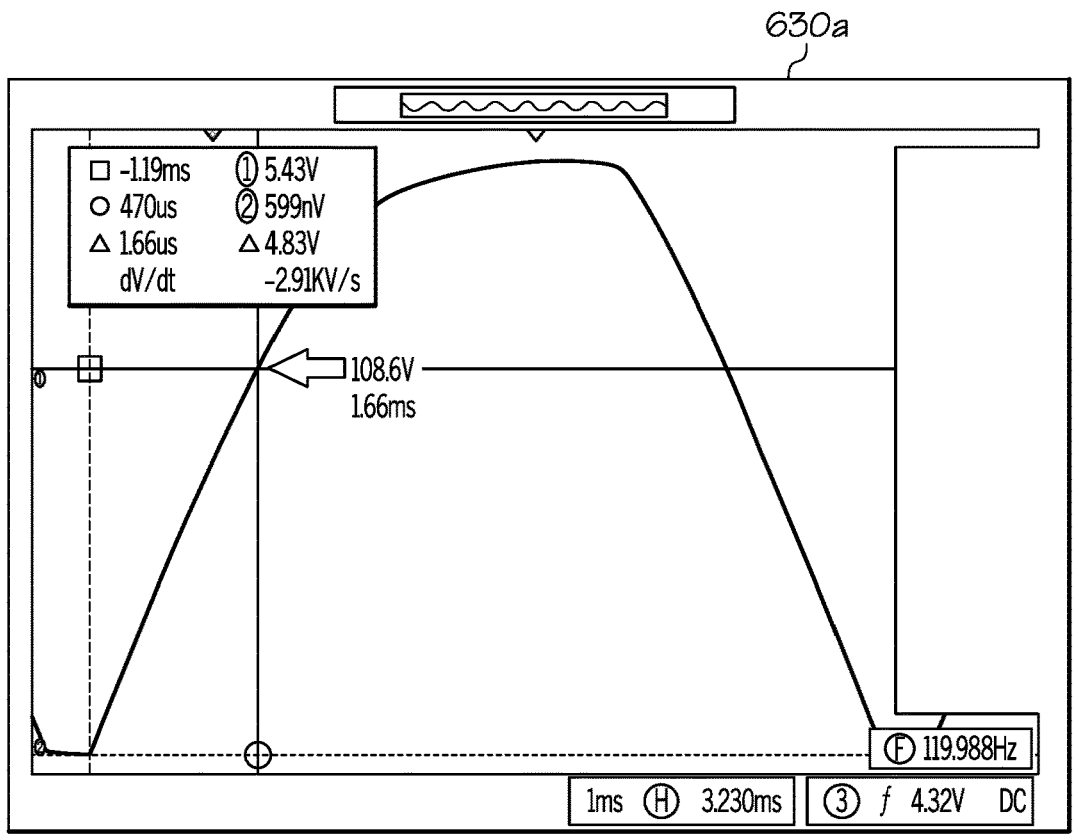
FIGS. 6A and 6B depict user interfaces that provide a platform for determining a second voltage step and a third voltage step, according to embodiments described herein.
Figure 6B:
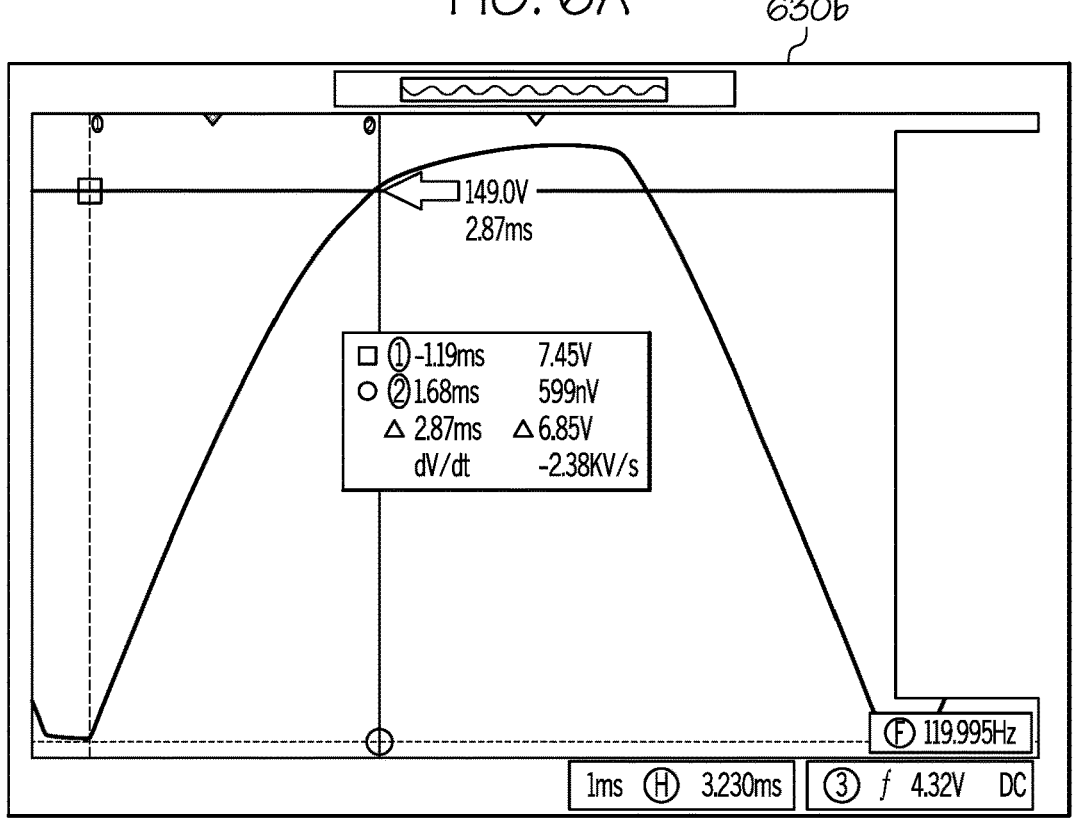

FIGS. 6A and 6B depict user interfaces 630a, 630b that provide a platform for determining a second voltage step and a third voltage step, according to embodiments described herein. Similar to the description of FIGS. 5A and 5B, the user interfaces 630a and 630b illustrate steps that are created at about 108.6 Volts and about 149.0 volts, respectively. With the steps created, the load changes may be implemented to adequately match the load with the voltage being received. Again, it should be understood that these voltages are also merely examples, as other voltages may be utilized for creating the steps, depending on the embodiment.

Figure 7A:
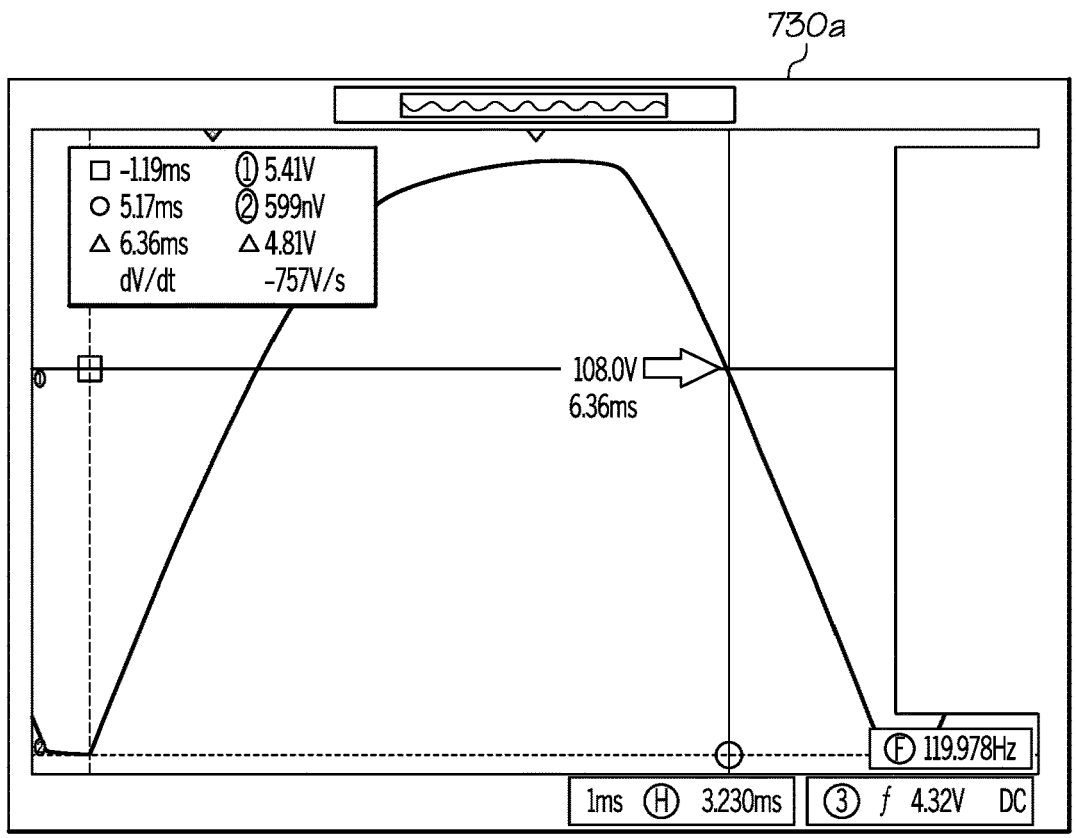
FIGS. 7A and 7B depict user interfaces that provide a fourth voltage step and a fifth voltage step on a backside of a waveform, according to embodiments described herein.
Figure 7B:
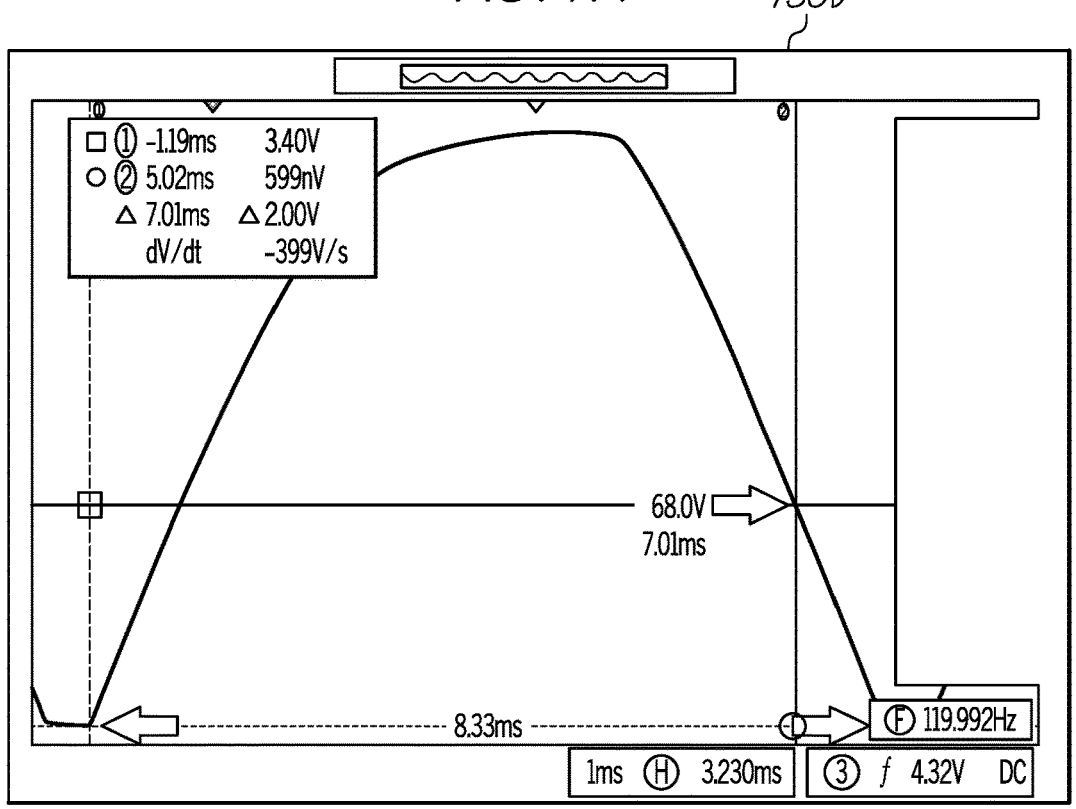

FIGS. 7A and 7B depict user interfaces 730a, 730b that provide a fourth voltage step and a fifth voltage step on a backside of a waveform, according to embodiments described herein. Similar to the user interfaces 630 from FIGS. 6A and 6B, the additional steps may be created on the descending side of the voltage waveform. Specifically, when the voltage waveform is about 108.0 volts, a step may be created, as well as when the voltage again reaches 68.0 volts.

Figure 8A:
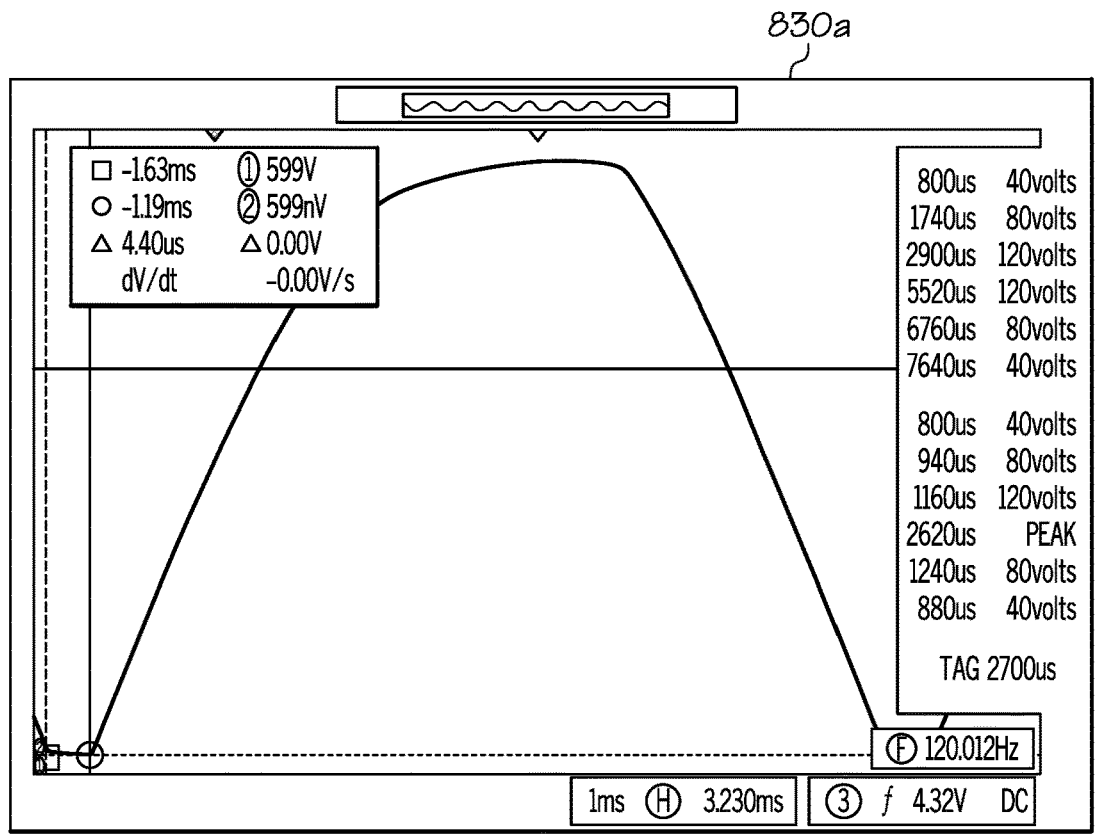
FIGS. 8A-8C depict user interfaces that provide data regarding the specified voltage steps, according to embodiments described herein.
Figure 8B:
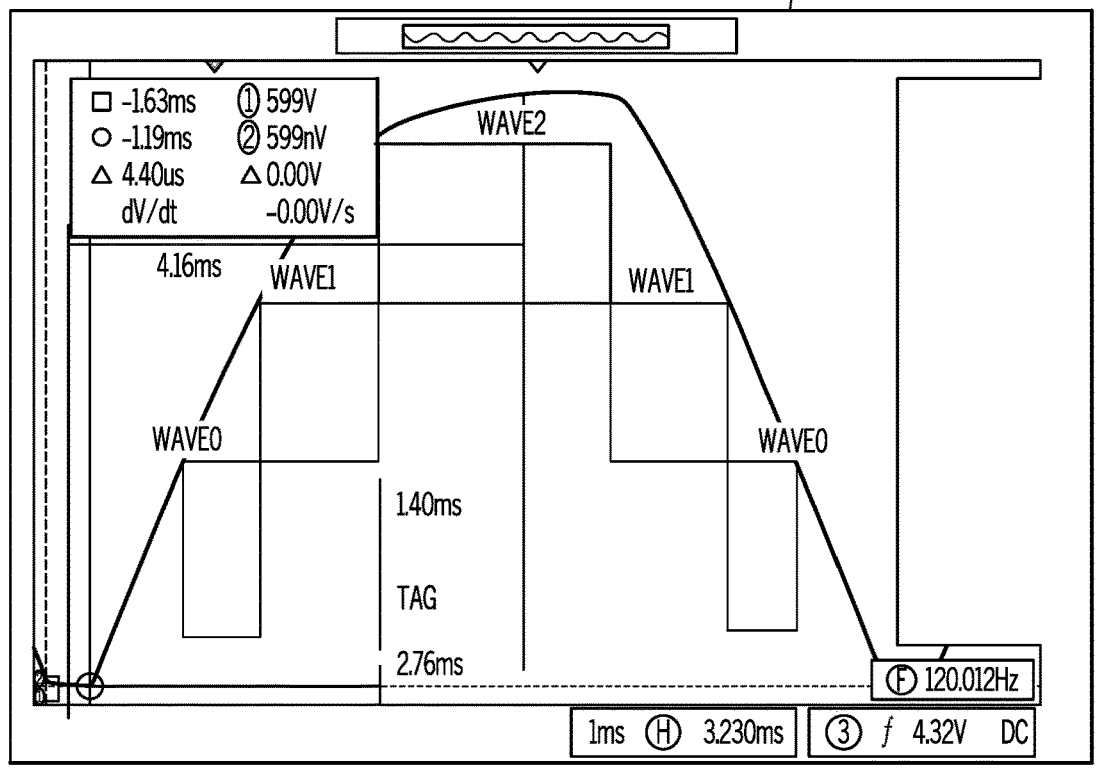
Figure 8C:
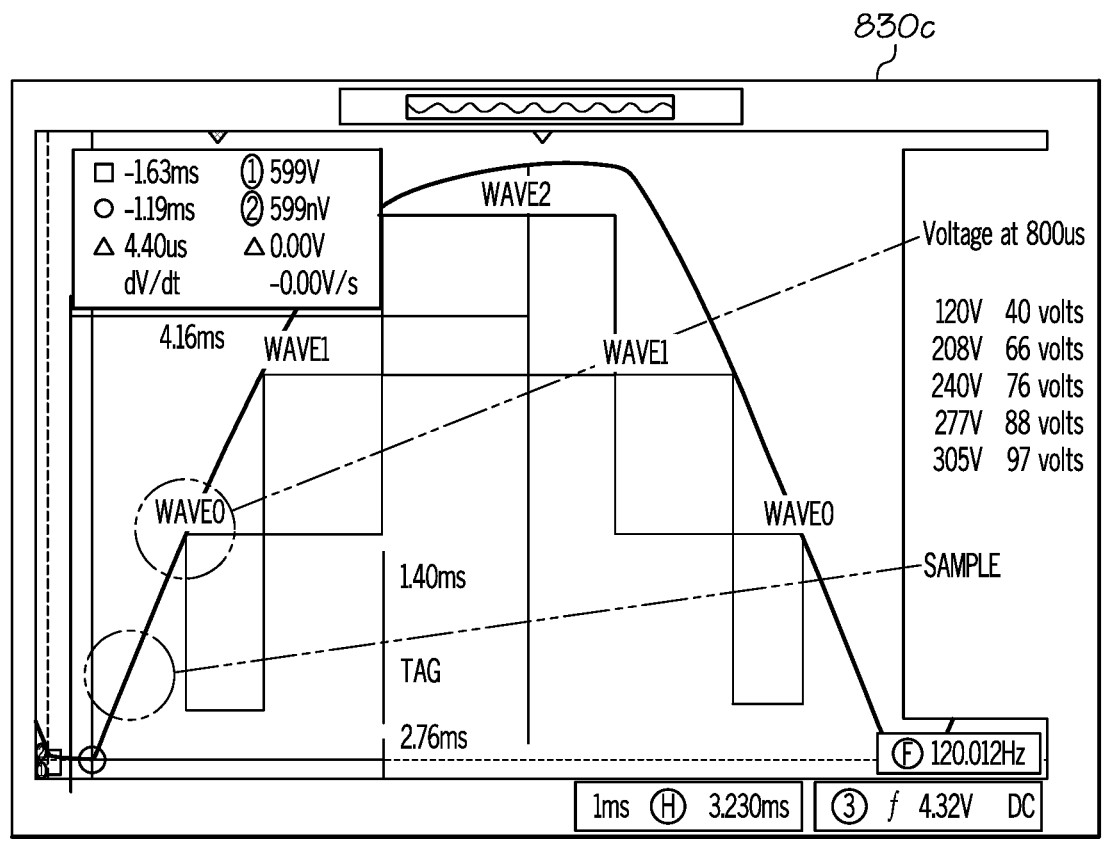

FIGS. 8A-8C depict user interfaces 830a, 830b, 830c that provide data regarding the specified voltage steps, according to embodiments described herein. As illustrated, the user interface 830a illustrates a chart depicting the steps that were created. FIG. 8B depicts graphically the created steps for implementation. FIG. 8C depicts a sample being taken to calculate the steps.

As illustrated in these user interfaces, a zero axis point was determined and a sample voltage was taken (FIG. 8C) at about 2.76 milliseconds. Based on the change in the voltage from the zero axis point and the sample, a lookup table may be accessed to facilitate a sinusoidal prediction of the maximum voltage and the period of the waveform. Based on this information, as well as information related to the load, steps may be created such that segments of the overall load may be allocated based on the voltage. As an example, a first segment of the load may have a voltage rating of about 68 volts and the first voltage step may be about 68 volts. As such, the first segment may receive the voltage for a predetermined amount of time before and/or after that voltage step. Once the voltage has changed a predetermined amount, the next step may trigger allocation of a second load segment (which may include the first load segment) such that the voltage rating of the second load segment corresponds with the voltage of the waveform at that time.

Figure 9:
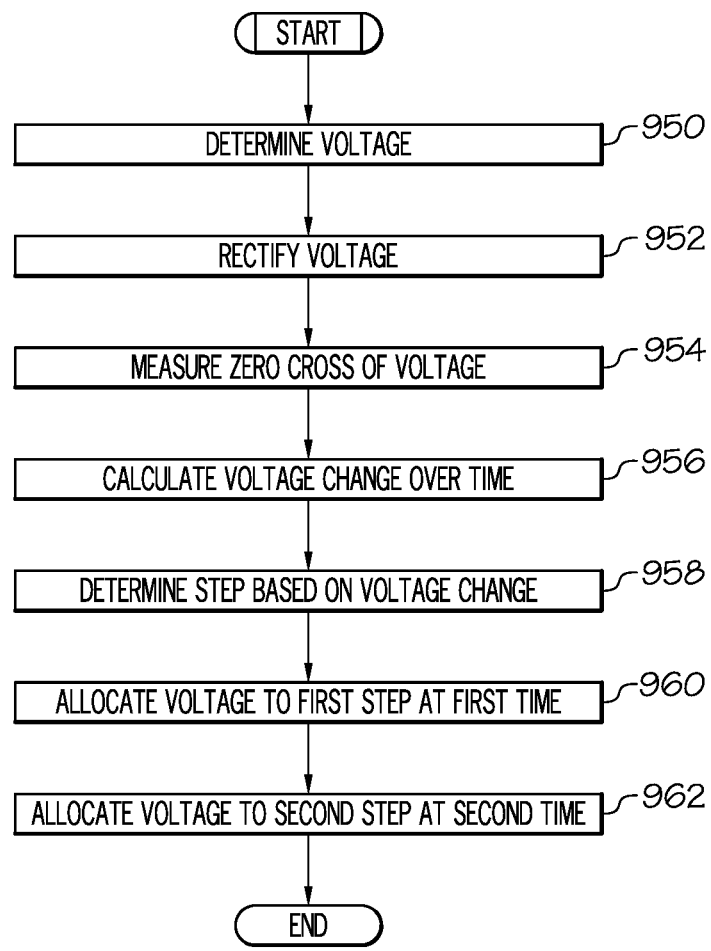
FIG. 9 depicts a flowchart for providing wave-based lighting efficiencies, according to embodiments described herein.

FIG. 9 depicts a flowchart for providing wave-based lighting efficiencies, according to embodiments described herein. As illustrated in block 950, a voltage may be determined. In block 952, the voltage may be rectified to remove the negative portions of the voltage waveform. In block 954, a zero cross point of the voltage may be measured. In block 957, a voltage change over time may be calculated. In block 958, a step may be determined based on the voltage change and then created. Creating the step may include creating a trigger at a predetermined time that opens or closes electrical current to the segments of the load. In block 960, voltage may be allocated to a first set of loads first step at a first time. In block 962, voltage may be allocated to a second set of loads at a second time.

As illustrated above, various embodiments for wave-based lighting efficiencies are disclosed. By creating one or more voltage steps, voltage may be allocated to a subset of the load, which may be changed, based on a change (or predicted change) in the received voltage. This provides more efficient use of power and reduces heat in the load. With that said, the changes in load utilization are fast enough to be imperceptible by a user.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for wave-based lighting efficiencies. It should also be understood that these embodiments are merely exemplary and are not intended to limit the scope of this disclosure.

The invention claimed is:

1. A method for providing wave-based lighting efficiencies, the method comprising:
    receiving, by a computing device, data related to an alternating current (AC) waveform, wherein the AC waveform is configured to power a plurality of loads, wherein each of the plurality of loads has a respective voltage rating;
    determining, by the computing device, a first subset voltage rating for a first subset of the plurality of loads;
    determining, by the computing device, a first position in the AC waveform that has a voltage that substantially matches the first subset voltage rating; and
    applying, by the computing device, the AC waveform to the first subset of the plurality of loads when the voltage of the AC waveform substantially matches the first subset voltage rating.

2. The method of claim 1, further comprising rectifying the AC waveform to modify at least one negative voltage portion of the AC waveform into at least one positive voltage portion.

3. The method of claim 1, further comprising:
    determining a second subset voltage rating for a second subset of the plurality of loads;
    determining a second portion in the AC waveform that has a voltage that substantially matches the second subset voltage; and
    applying the AC waveform at the second step to the second subset of the plurality of loads when the voltage of the AC waveform substantially matches the second subset voltage rating.

4. The method of claim 1, wherein the plurality of loads includes a plurality of light emitting diodes.

5. The method of claim 1, wherein determining the first subset of the plurality of loads comprises comparing the respective voltage ratings with the AC waveform.

6. The method of claim 1, further comprising:
    determining that voltage of the AC waveform increases from the voltage that substantially matches the first subset voltage; and
    adding the second subset of the plurality of loads to the AC waveform with the first subset of the plurality of loads.

7. The method of claim 6, further comprising:
    determining that voltage of the AC waveform decreases from a voltage that substantially matches a voltage rating of the first subset of the plurality of loads and the second subset of the plurality of loads; and
    removing the second subset of the plurality of loads from the AC waveform.

8. A system for providing wave-based load efficiencies, the system comprising:
    a load that includes a plurality of individual devices;
    a computing component that is coupled to the load and includes a processor and a memory component that stores logic that, when executed by the processor, causes the system to perform at least the following:
        receive data related to an alternating current (AC) voltage, wherein the AC voltage is configured to power the load;
        determine a first portion of the load that includes at least one of the plurality of individual devices;
        determine a first voltage rating for the first portion of the load;
        determine a first position on the AC voltage that has a voltage that substantially matches the first portion of the load; and
        apply the AC voltage to the first portion of the load when the AC voltage has a voltage that substantially matches the first portion of the load.

9. The system of claim 8, further comprising a rectifier that rectifies at least one negative portion of the AC voltage into a positive voltage portion.

10. The system of claim 8, further comprising a transition component that determines an amount of voltage received and, based on the amount of voltage received, alters a ground voltage.

11. The system of claim 8, wherein the memory component stores logic that causes the system to perform at least the following:
    determine a second portion of the load that includes at least one other device of the plurality of individual devices; and
    determine a second voltage rating for the second portion of the load.

12. The system of claim 11, wherein the memory component stores logic that further causes the system to perform at least the following:

determine a second portion in the voltage that has a voltage that substantially matches a voltage of the second portion of the load combined with the first portion of the load; and apply the AC voltage to the first portion of the load and the second portion of the load when the AC voltage has a voltage that substantially matches the voltage of the second portion of the load combined with the first portion of the load.

13. The system of claim 12, wherein the memory component stores logic that further causes the system to determine a voltage rating for at least one of the following: the load, the first portion of the load, or the second portion of the load.

14. The system of claim 8, wherein the memory component stores logic that further causes the system to determine the first portion of the load based on analysis of the AC waveform and a determination of individual devices in the load.

15. A device for providing wave-based load efficiencies, the device comprising:
a processor; and
a memory component that stores logic that, when executed by the processor, causes the device to perform at least the following:
receive a characteristic of a voltage for powering a load, wherein the voltage includes positive voltage portions, negative voltage portions, and zero axis points, wherein the load includes a plurality of individual devices;
allocate a first subset of the load that includes at least one of the plurality of individual devices;
determine a first voltage rating of the first subset of the load;
determine a first position of the voltage that corresponds with the first voltage rating; and
apply the voltage to the first subset of the load when the voltage corresponds with the first voltage rating.

16. The device of claim 15, wherein the logic further causes the device to rectify the voltage to modify at least one of the negative voltage portions into a positive voltage portion.

17. The device of claim 15, wherein the logic further causes the device to perform at least the following:
determine a second position of the voltage that corresponds with a voltage rating of a second subset of the load combined with the first subset of the load; and
apply the voltage to the second subset of the load when the voltage corresponds with a voltage rating of the second subset of the load combined with the first subset of the load, wherein the second subset includes at least one of the plurality of individual devices and has a second voltage rating that corresponds to the second step voltage.

18. The device of claim 15, wherein the plurality of individual devices includes an array of light emitting diodes.

19. The device of claim 15, wherein the logic further causes the device to perform at least the following:
determine that the voltage increases from corresponding with the first voltage rating; and
add the second subset of the load to the AC voltage with the first subset of the load.

20. The device of claim 19, wherein the logic further causes the device to perform at least the following:
determine that voltage decreases from corresponding the first voltage rating; and
removing the second subset of the load from the voltage.

* * * * *